United States Patent [19]
Nakano et al.

[11] 3,952,546
[45] Apr. 27, 1976

[54] ELASTIC COUPLING

[75] Inventors: Hideaki Nakano; Tadahiro Ozu; Takashi Okayama, all of Kobe, Japan

[73] Assignee: Kawasaki Jukogyo Kabushiki Kaisha, Kobe, Japan

[22] Filed: Aug. 23, 1974

[21] Appl. No.: 499,952

[52] U.S. Cl............................. 64/27 NM; 64/11 R; 64/13
[51] Int. Cl.² ........................................ F16D 3/14
[58] Field of Search ................ 64/11 R, 13, 27 NM, 64/14, 27 R

[56] References Cited
UNITED STATES PATENTS

| | | | |
|---|---|---|---|
| 1,928,763 | 10/1933 | Rosenberg | 64/27 NM |
| 2,154,077 | 4/1939 | Sampson | 64/11 R |
| 3,245,229 | 4/1966 | Fadler | 64/11 R |

FOREIGN PATENTS OR APPLICATIONS

| | | | |
|---|---|---|---|
| 972,890 | 11/1964 | United Kingdom | 64/11 |
| 112,266 | 11/1944 | Sweden | 64/11 |

*Primary Examiner*—Samuel Scott
*Assistant Examiner*—Randall Heald
*Attorney, Agent, or Firm*—Sughrue, Rothwell, Mion, Zinn & Macpeak

[57] ABSTRACT

Herein disclosed is an elastic coupling using rubber or an elastomer as an elastic element. The elastic coupling includes an inner metal ring having its radially outer surface radially curvilinearly convexed, an outer metal ring having its radially inner surface radially curvilinearly convexed, and an elastomer ring interposed between the inner and outer metal rings and having its radially inner and outer surfaces correspoindingly radially cirvilinearly concaved as to be fitably secured, respectively, to the outer surface of the inner metal ring and to the inner surface of the outer metal ring. Thus, the modulus of shearing strain of the surface portions of the elastomer ring at the side is smaller than that of an inside portion of the same so as to eliminate any pretension of the surfaces of the elastomer ring.

6 Claims, 12 Drawing Figures

TIME PERIOD FOR VULCANIZATION

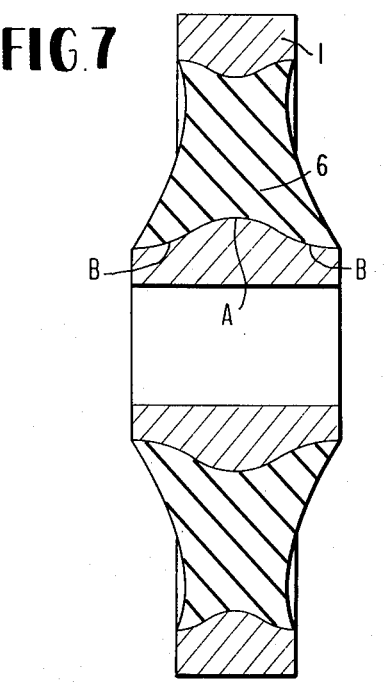
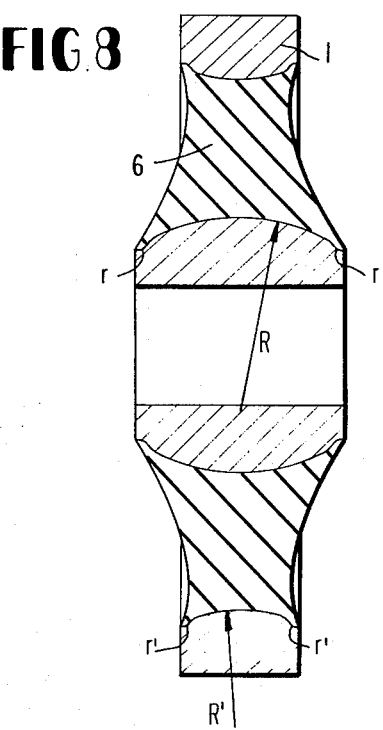
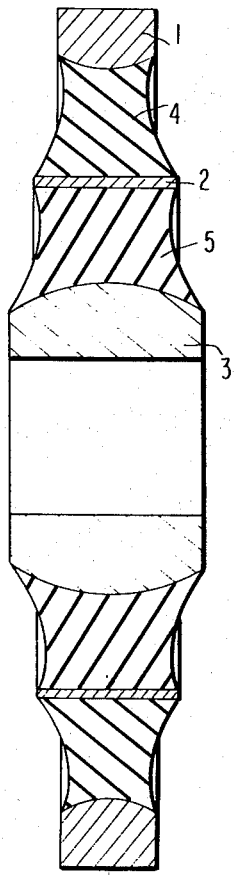
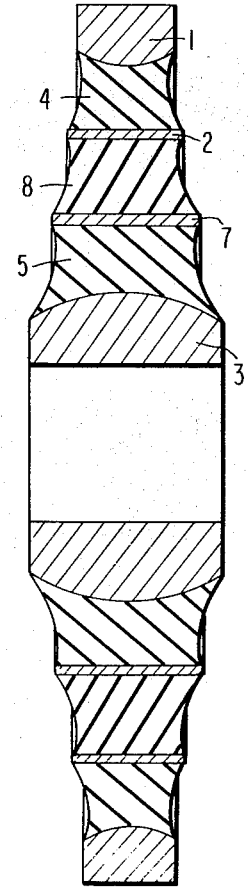
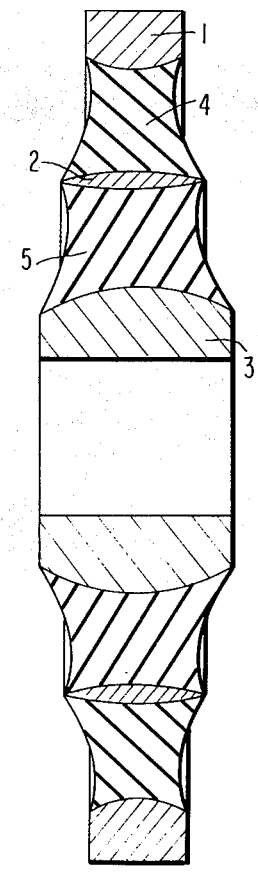
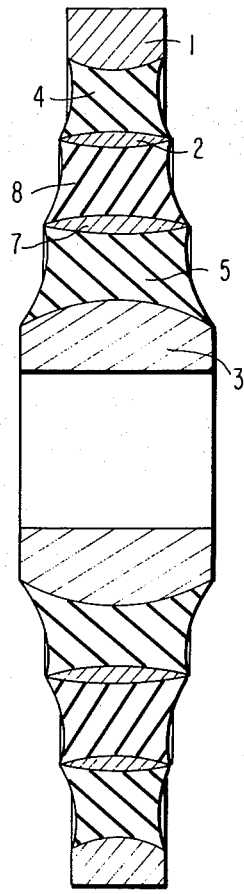

ELASTIC COUPLING

BACKGROUND OF THE INVENTION

1. Field of the Invention

The present invention relates to an elastic coupling, and more particularly to an improved elastic coupling to which a novel theory is applied.

2. Description of the Prior Art

A power transmission mechanism for a prime mover or driven mechanism having a reciprocating mechanism is well known to have concomitant drawbacks such as variations in torque or torsional vibrations or impacts, all of which are detrimental to the mechanical parts or shaft systems of the power transmission mechanism. In this power transmission mechanism, therefore, an elastic coupling is frequently used for absorbing and damping or blocking those detrimental phenomena so as to continue safe drive of the transmission mechanism. Especially in recent years, more severe conditions are being imposed upon the elastic coupling as the requirements for high output and speed of the prime mover and for improvement in economy of the transmission mechanism become stronger. The elastic coupling now in practical use has a number of types and kinds, which have respective advantages and disadvantages. It can be concluded here that the excellency of an elastic coupling is enhanced by meeting requirements such as the requirement for correct transmission of drive power, the requirement for the driven portions to be protected from the applied vibrations or noises or to enjoy prolinged life time, or the requirement for the performance of the elastic coupling to be raised or equalized.

The most important condition, with which an elastic coupling should be furnished, is sufficient elasticity. For this purpose, a metal spring of leaf or coil type, a rubber tube filled with air or a viscous medium, a rubber or elastomer element, and the like are used as an elastic element for the elastic coupling. Thus, the elastic coupling made of rubber or the like is most frequently used for its excellent effects, such as, its wide applicability to a load of multi-directionality in compression, shear and torsion, and the effective damping, noise-blocking and insulating performances, excepting for its durability.

In order to enhance durability of the elastic coupling using an elastic element of rubber or an elastomer, a variety of devices have been made and put into actual practice, including one of the most effective coupling, which is shown in FIGS. 1 and 2 of the accompanying drawings. The elastic coupling of FIG. 1 is composed of three metal rings 1, 2 and 3, and of rubber rings 4 and 5 which are interposed between the metal rings 1, 2 and 3 and which are fitably secured thereto by a vulcanizing treatment. Each of these rubber elements 4 and 5 is divided into halves with respect to the longitudinal direction of the elastic coupling. If, however, the number of the rubber elements is other than two, it will be easily understood that each of them is also divided into halves in the longitudinal direction. As is apparent from FIG. 1 showing the elastic element under the free condition before it is assembled with its halves confronting each other, a longitudinal spacing S is formed between the divided halves of the outer metal ring 1. In FIG. 2, on the other hand, the elastic coupling is shown as under the assembled condition, in which the halves of the outer metal ring 1 are fixed to each other by means of bolts 9 (although not concretely shown) with the spacing S reduced to zero. Reference will now be made to FIG. 3, in which the illustration of the elastic coupling is enlarged to explain its fixed condition. In FIG. 3, the solid lines show the elastic coupling under the free condition before it is assembled, while the broken lines show the elastic coupling under the assembled condition. Those sufaces of the metal rings 1, 2 and 3 and of the rubber elements 4 and 5, which are to be secured to each other by the vulcanizing treatment, are inclined to have a conical cross-section, as shown by the solid lines. As a result, when the halves of the outer metal ring 1 are pushed into contact with each other, the rubber rings will be subjected, as shown by the broken lines, to deformation, which takes place in the direction perpendicular to that of torque transmission of the rubber rings. In FIG. 3, more specifically, the radial height $l$ of the whole rubber element under the free condition will be reduced to $l'$ due to the deformation after the elastic coupling is assembled. The difference, $\Delta l$, in the heights before and after assembly will impart a pushing forth to the inclined contact surface of the metal rings 1, 2 and 3 and of the rubber rings and at the same time will impart a compression to the insides of the rubber rings. This compression is called as the "precompression", because it is preliminarily imparted to the rubber rings during the assembly process before a torque is transmitted to the elastic coupling. It is widely admitted that application of the precompression will result in effectiveness in strengthening adhesiveness by the vulcanizing treatment and in heightening the anti-wear strength of the rubber element. As an example of the material based on the above theory, pre-stressed concrete is well known, which aims at similar effects. One of the disadvantages, which are concomitant with the coupling rubber element of the pre-compression construction, is that the resultant effects coming from the pre-compression treatment cannot be expected uniformly in all portions of the rubber element from the deformation due to the compression. In the rubber element of the compression type, more specifically, since its design is made assuming that the radial shearing stress is identical for any portion, the cross-section of the rubber element taken in the radial direction is formed such that the thickness of the element (taken in the direction perpendicular to the radial direction, namely, in the longitudinal direction) assumes such a value as is inversely proportional to the radius. As will be easily understood, a compressive stress is established on the surface of the rubber element which is pulled during the pre-compression treatment, whereas a tensile stress is built up on substantial surface of the opposite side. This tendency is found not only on the surfaces of the rubber element but also internally and on such surfaces of the element as are to be secured to the metal rings by the vulcanizing treatment. In a mechanical element such as an elastic coupling, reduction in local durability due to the irregular quality coming from its particular construction will hardly fail to lead to material reduction in durability of the elastic coupling as a whole. This undesirable phenomenon is confirmed by the experiment, in which the pre-compression treatment adversely affects partially the elastic coupling.

On the other hand, when it is intended to shift one half of the outer metal ring 1 or FIG. 1 by the distance half of the spacing S with respect to one half of the adjoining rubber ring 4, such a great force is required as can compress the total height of the rubber rings 4 and 5 by the length $\Delta l$. In order to obtain the inter balance in the forces including that great force, moreover, the confronting halves of the rubber rings are required to be fastened to each other, as shown in FIG. 2. This means that the division of the rubber element into two halves is an indispensable condition for an elastic coupling. This condition in turn becomes unfavourable for the elastic coupling to be assembled or disassembled.

SUMMARY OF THE INVENTION

It is, therefore, an object of the present invention to provide an improved elastic coupling, from which the foregoing drawbacks concomitant with the prior art are completely eliminated.

Another object of the present invention is to provide an improved elastic coupling of the above type, which has novel and excellent advantages.

According to a major aspect of the present invention, there is provided an improved elastic coupling, which comprises an inner metal ring having its radially outer surface radially curvilinearly convexed, an outer metal ring having its radially inner surface radially curvilinearly convexed, and an elastomer ring interposed between the inner and outer metal rings and having its radially inner and outer surfaces correspondingly radially curvilinearly concaved as to be fitably secured, respectively, to the outer surface of the inner metal ring and to the inner surface of the outer metal ring, whereby the modulus of shearing strain of a surface portion of the elastomer ring is smaller than that of an inside portion of the same so as to eliminate any pretension of the surfaces of the elastomer ring.

BRIEF DESCRIPTION OF THE DRAWINGS

Other objects and advantages of the present invention will become apparent from the description taken in conjunction with the accompanying drawings, in which:

FIGS. 7 to 12 are similar to FIG. 4 but show other embodiments of the present invention.

DESCRIPTION OF THE PREFERRED EMBODIMENTS

Figure 1:
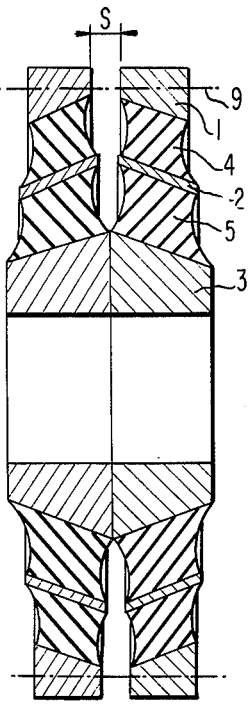
FIG. 1 is a longitudinal section of a conventional elastic rubber coupling under its free condition before it is assembled.
Figure 2:
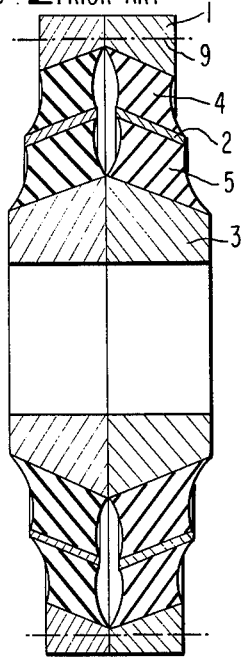
FIG. 2 is similar to FIG. 1 but shows the conventional elastic rubber coupling under its assembled condition.
Figure 3:
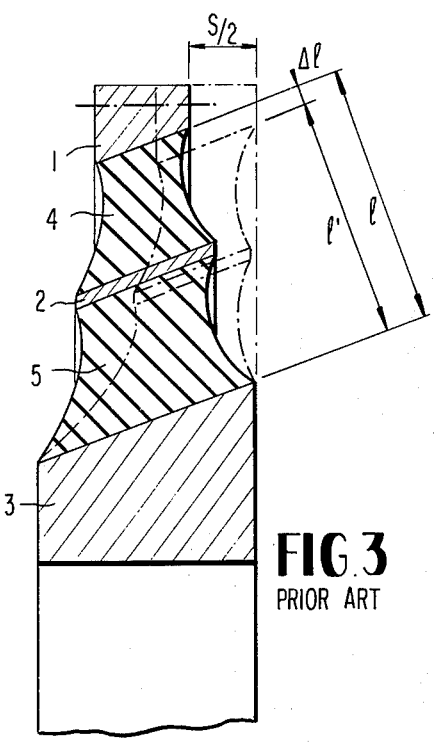
FIG. 3 is an illustrative view showing diagrammatically the operation of the elastic rubber coupling of FIGS. 1 and 2.
Figure 4:
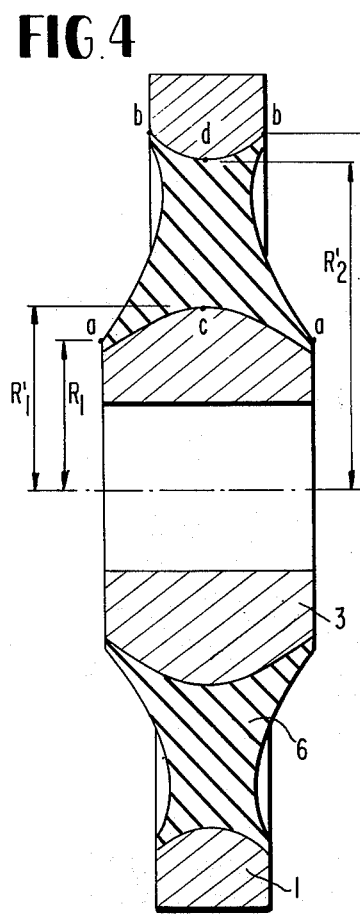
FIG. 4 is similar to FIGS. 1 and 2 but shows an elastic rubber coupling exemplifying the present invention.
Figure 5:
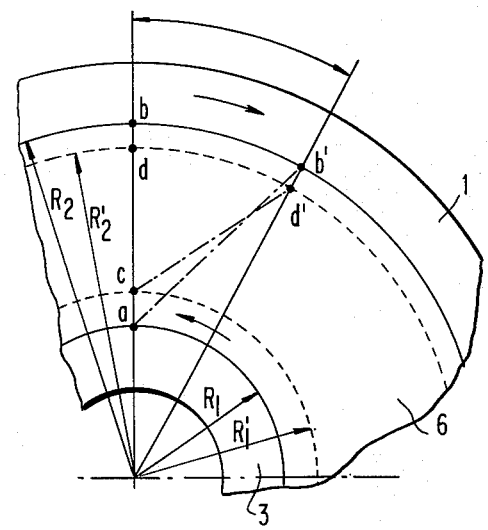
FIG. 5 is a diagrammatical view explaining the operation of the elastic rubber coupling of FIG. 4.

Reference will now be made to FIG. 4, in which a first embodiment of the present invention is shown. In FIG. 4, reference numerals 1, 3 and 6 indicate, respectively, an outer metal ring, an inner metal ring, and a rubber ring which is secured by the vulcanizing treatment to the outer and inner metal rings 1 and 3. Turning to FIG. 5 showing the front elevation of the elastic coupling of FIG. 4, the torque to be transmitted through the elastic coupling is transmitted from the outer metal ring 1 to the inner metal ring 3, and vice versa, through the torsional force of the rubber ring 6. Among these elastic couplings, an elastic coupling of the type, in which the lines $aa$ and $bb$ as shown in FIG. 4 are linear, is well known in the relevant art. In the elastic coupling having the concave $aa$ and $bb$, however, when both the line $ab$ on the surface of the rubber element and the line $cd$ between the centers on the rubber surfaces are turned by an angle of $\zeta$ by applying a torque to the elastic coupling with the point $c$ and $a$ being fixed, the outer edge point $b$ is shifted to the point $b'$ and the outer center point $d$ is shifted to the point $d'$, thus extending the lines ab and cd to lines $ab'$ and $cd'$, respectively. Here, the modulus of shearing strain, which has great influence on the breaking strength and durability of the rubber element, is defined for the elastic coupling of the present invention, as in the following equation:

$$\epsilon = \frac{\phi(R_2 + R_1)}{2(R_2 - R_1)};$$

where $R_1$ denotes radius of the outer edge point a of the inner metal ring 3, $R_1'$ denotes radius of the center point c of the convex surface of the inner metal ring 3, $R_2$ denotes radius of the inner edge point b of the outer metal ring 3, and $R_2'$ denotes radius of the center point d of the convex surface of the outer metal ring 1.

Then, if the moduli of shearing strain of the center portion and the surface portion of the rubber element are denoted, respectively, by $\epsilon_1$ and $\epsilon_2$ when the elastic rubber coupling is twisted by the angle of $\zeta$ as shown in FIGS. 4 and 5, the moduli $\epsilon_1$ and $\epsilon_2$ are expressed by the following equations:

$$\epsilon_1 = \frac{\phi(R_2' + R_1')}{2(R_2' - R_1')}; \text{ and } \epsilon_2 = \frac{\phi(R_2 + R_1)}{2(R_2 - R_1)}.$$

If, in this instance, the metal rings are so convexed, as shown in FIGS. 4 and 5, that the height of the center portion of the rubber element is smaller than that of the side portions in a manner to have relationships $R_2 > R_2'$ and $R_1' > R_1$, then the difference between the moduli of shearing strain of the center portion and of the side portions of the rubber element can be obtained from the following equation:

$$\epsilon_1 - \epsilon_2 = \frac{\phi(R_2' + R_1')}{2(R_2' - R_1')} - \frac{\phi(R_2 + R_1)}{2(R_2 - R_1)}$$

$$= \frac{\phi}{2} \cdot \frac{R_2'R_2 + R_1'R_2 - R_2'R_1 - R_1'R_1 - R_2'R_2 - R_1R_2' + R_1'R_2 + R_1'R_1}{(R_2' - R_1')(R_2 - R_1)}$$

$$= \phi \cdot \frac{R_1'R_2 - R_2'R_1}{(R_2' - R_1')(R_2 - R_1)} > 0$$

Therefore, the following relationship holds:

$\epsilon_1 > \epsilon_2$. than

From this relationship, it can be deduced that the modulus $\epsilon_1$ of shearing strain at the center portion of the rubber element is larger than that $\epsilon_2$ at the side portions.

In consideration of this relationship, the present invention is based on the concept that the moduli of shearing strain of the center portion and of the side portions of the rubber element are varied as a function of the effect of vulcanization, the deterioration and aging of the surfaces and the degree of concentration of stress, so that the constructional cross-section of the rubber element may effect a uniform condition with respect to the durabilities of the respective portions thereof. Here, the life time of the elastic coupling of this kind is dependent heavily upon the surface condition of its rubber element. In view of this, the present invention contemplates to prolong the life time of the elastic coupling by enhancing the durability of the surface portion of the rubber element and by simplifying the construction of the elastic coupling in comparison with that of the prior art. Thus, the elastic coupling according to the present invention can find a variety of excellent applications.

According to the present invention, therefore, in an elastic coupling using rubber or an elastomer as an elastic element, the rubber element and its surfaces to be secured to the metal rings are so constructed that the modulus of shearing strain of a surface portion of the rubber element at its side is smaller than that of an inside portion of the same so as to eliminate the initial tension or pre-tension of the surfaces of the rubber element. Thus, that deterioration of the surfaces, which takes place under the influence of the existence of ozone in the air and which determines the durability of the rubber or the elastomer, can be obviated to exhibit the effect of improving the particular durability. As a result, the initial tension, which might otherwise be built up in a local portion of the rubber element due to the pre-compressive treatment applied for enhancing the durability, can be remarkably eliminated.

Figure 6:
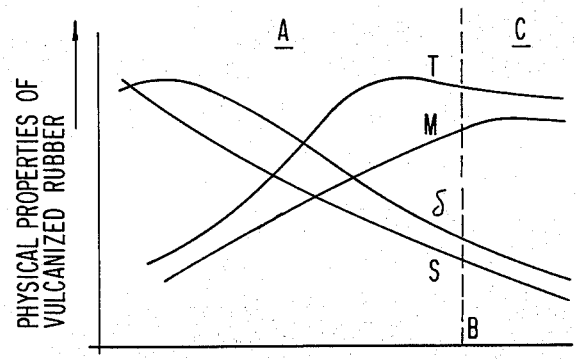
FIG. 6 is a graphical presentation showing relationships between physical properties and time period for vulcanization of vulcanized rubber.

Here, since the rubber to be used in the elastic coupling of this kind is generally secured to the metal rings by the vulcanizing treatment at an elevated temperature, an optimum level is known to exist for the cure time period of rubber having a given composition. Reference will now be made to FIG. 6, which shows general tendency of the relationship between the physical properties of vulcanized rubber and the time period for the vulcanizing treatment plotted against the physical properties. In FIG. 6, reference letters B, A and C will indicate the optimum cure point, unvulcanized region and over cure region, respectively. As to the physical properties, on the other hand, letters T, M, δ, and S will denote the tensile strength, the modulus, the extension and the set (or the permanent strain), respectively. The cure time period is determined partly by the cure temperature, but such rubber is not desirable in view of economy and quality as has a composition greatly retarding the rate of vulcanization. For a predetermined time period for vulcanization, some difference in temperature will inevitably come out between the inside and the surface layer of the rubber having a low coefficient of heat transfer. Especially for an elastic coupling of high capacity which is needed for a prime mover of high output type, a rubber element having a large thickness in view of dimesional performance is required, which will build up a high difference between the vulcanization temperatures for the center portion and the surface layers of the rubber element. More specifically, if the center portion of the rubber element is subjected to proper vulcanization, then the surface layers of the rubber element will be vulcanized to an extent exceeding the proper time period for vulcanization. If, on the contrary, the surface layers are subjected to the proper vulcanization, the time period required for the surface layers will be insufficient for the proper period for the center portion of the rubber element, so that the center portion will be left at an under cure condition. In either event, it is almost inevitable to incur non-uniformity in the vulcanization treatment between the center portion and the surface layers of the rubber element. In accordance with the present invention, however, since the center portion of the rubber element having a low coefficient of heat transfer can be positioned during the heat treatment adjacent to the convex portion of the metal ring having a high coefficient of heat transfer, the efficiency in the heat transfer can be remarkably improved. Moreover, both the reduction in the anti-aging performance and the improvement in loosening of the concentration of stress on the surfaces of the rubber element, both of which come from the slight over-heating of the surface layers, can be compensated by accordingly reducing the modulus of shearing strain of the surface layers in comparison with the center portion of the rubber element, so that the conditions for actual use can be effectively uniformalized. Since, still moreover, the surfaces of the metal ring and of the rubber element to be secured to each other are curvilinearly convexed, the length of the surfaces per unit longitudinal length of the metal ring can be enlarged in comparison with that of the conventional elastic coupling, so that the strength of the surface securement for the same dimension can be effectively enhanced. From the similar reasoning, the tensile stress of the surface, which might otherwise take place due to the shrinkage of the rubber during the cooling process after the vulcanizing treatment, can be effectively weakened.

As to the applications of the present invention, since the elastic coupling of the invention can desirably select the number of the rubber element in accordance with the required torque and the intended usage, it can enjoy a variety of adaptability in the torque and the usage.

The present invention will be modified into several embodiments, which will now be described in the following.

In the embodiment as shown in FIG. 7, the elastic coupling has a rubber element of thick type, in which it is difficult to uniformalize the temperatures for the vulcanizing treatment between the center portion and the surface layers of the rubber element. In FIG. 7, reference numerals 1, 3 and 6 indicate, respectively, the outer metal ring, the inner metal ring, and the rubber ring which is secured by the vulcanizing treatment to the outer and inner metal rings 1 and 3. The non-uniformity in the vulcanization is compensated by changing so continuously the moduli of shearing strain both of the surface portion and of the inside portion of the rubber ring as to approach each other, thus uniformalizing the performance and durability of the elastic coupling as a whole. More specifically, if it is denoted that the time period for vulcanizing the rubber element be T, the thickness of the rubber element be $t$, and the coefficient of heat transfer of the rubber element be A, then the relationship among them can be obtained empirically from the following general equation:

$$T = At^2.$$

From this equation, it can be said that the rubber element has to be heated for the vulcanizing treatment for a time period proportional to its thickness. It is, however, impossible to vulcanize the center portion and the surface layers of the rubber element for different time periods. In actual practice, the extent of non-uniformity in vulcanization between the inside center portion and the surface layers of the rubber element, which takes place by forcibly equalizing the vulcanization time periods inbetween, becomes proportional to the square of the rubber thickness, as is apparent from the relationship between the rubber thickness and the vulcanization time period. In view of this, the surface A of the metal rings 1 and 3 and the rubber ring 6 to be secured to each other are formed such that the cross-section taken in the direction of thickness of the rubber ring is defined by such a curve as has its height varied in proportion to the square of the rubber thickness. As is apparent from FIG. 7, therefore, the cross-section is formed to have a convexed center portion A and gentler sloped side skirt portions B. Thus, the cross-section is so constructed that the condition for use, namely, the shearing strain is softened at the portions adjacent to the surface layers having a low grade material, and that the particular condition is made relatively severe at the center portion having a high grade material, so that the condition may be varied continuously from the former to the latter. As a result, the loads to be applied to the respective portions of the rubber element can be equalized to become free from any deterioration in the quality of the whole elastic coupling by the partial weak points in respect of the durability, thus providing an elastic coupling enjoying excellent effects.

Turning now to FIG. 8, there is shown another embodiment of the present invention, in which strengthening of the surface layers of the rubber element is aimed at. As to the surface layers, whose strength is the most important in an elastic coupling of this kind, the surfaces of the inner and outer metal rings 3 and 1 and the rubber ring 6 to be secured to each other are so formed that their inside center portion is formed with convexly arched curves having larger diameters R and R' and their side portions are formed with similar curves having smaller diameters $r$ and $r'$. With these construction arrangements, the surface layers can have a modulus of shearing strain remarkably smaller than that of the inside portion, so that the deterioration due to the ozone attack and its proceeding and the concentration of stress upon the torque transmission can be weakened. In this way, those portions of the surface layers, which are the most subject to the ozone attck, namely, which include the surface layer portions extending about 2 mm from the side surfaces of the rubber element, are made to have its modulus of shearing strain smaller than that of the inside portion of the rubber element, so as to equalize their durability to that of the inside portion.

Now, a problem that the height of the rubber element is markedly increased arises when it is intended to effectively reduce the modulus of shearing strain of the surface layers in comparison with the center portion. This problem can be solved by the examples, as shown in FIGS. 9 to 12. In these examples, an intermediate metal ring or rings 2 or 2 and 3 are interposed between separated rubber rings 4 and 5 or between separated rubber rings 4, 5 and 8, thus preventing the buckling of the rubber element. In the examples of FIGS. 9 and 10, more specifically, the variations in cross-sections of the outer metal ring 1 and the inner metal ring 3 can lead to variations in the moduli of shearing strain. In the case, moreover, where the variations in the particular moduli are produced by the cross-sectional variations of the two metal rings 1 and 3 when the intermediate metal ring 2 or ring 2 and 7 are inserted, the metal ring 2 or rings 2 and 7 may be shaped into the form of a convex lens, as shown in FIGS. 11 and 12, so as to vary the moduli of shearing strain.

While the invention has been described in detail and with reference to specific embodiments thereof, it will be apparent to one skilled in the art that various changes and modifications can be made therein without departing from the spirit and scope thereof.

What is claimed is:

1. An elastic coupling comprising an inner metal ring having its radially outer surface radially curvilinearly convexed, an outer metal ring having its radially inner surface radially curvilinearly convexed, and an elastomer ring interposed between said inner and outer metal rings and having its radially inner and outer surfaces radially curvilinearly concaved and vulcanized, respectively, to the correspondingly contoured outer surface of said inner metal ring and to the inner surface of said outer metal ring, such that the modulus of shearing strain of a surface portion at the side of said elastomer ring is smaller than that of an inside portion of the same to eliminate initial tension within the surfaces of said elastomer ring.

2. An elastic coupling according to claim 1, wherein the side surfaces of said elastomer ring are longitudinally concaved.

3. An elastic coupling according to claim 1, wherein the convexities of the outer surface of said inner metal ring and the inner surface of said outer metal ring have slopes which become gentler towards their longitudinal sides, whereby the moduli of shearing strain both of the surface portion at the side of the ring and of the inside portion of said elastomer ring change continuously so as to approach each other.

4. An elastic coupling according to claim 1, wherein said elastomer ring includes at least two ring portions which are radially separated to have their confronting surfaces radially registered, further comprising at least one intermediate metal ring fitted between the ring portions of said elastomer ring.

5. An elastic coupling according to claim 4, wherein the confronting surfaces of said ring portions are made to lie, respectively, on concentric circles, and wherein said at least one intermediate metal ring is shaped radially flat.

6. An elastic coupling according to claim 4, wherein the confronting surfaces of said ring portions are radially concaved, and wherein said at least one intermediate metal ring is correspondingly radially convexed.

* * * * *